United States Patent Office
3,181,997
Patented May 4, 1965

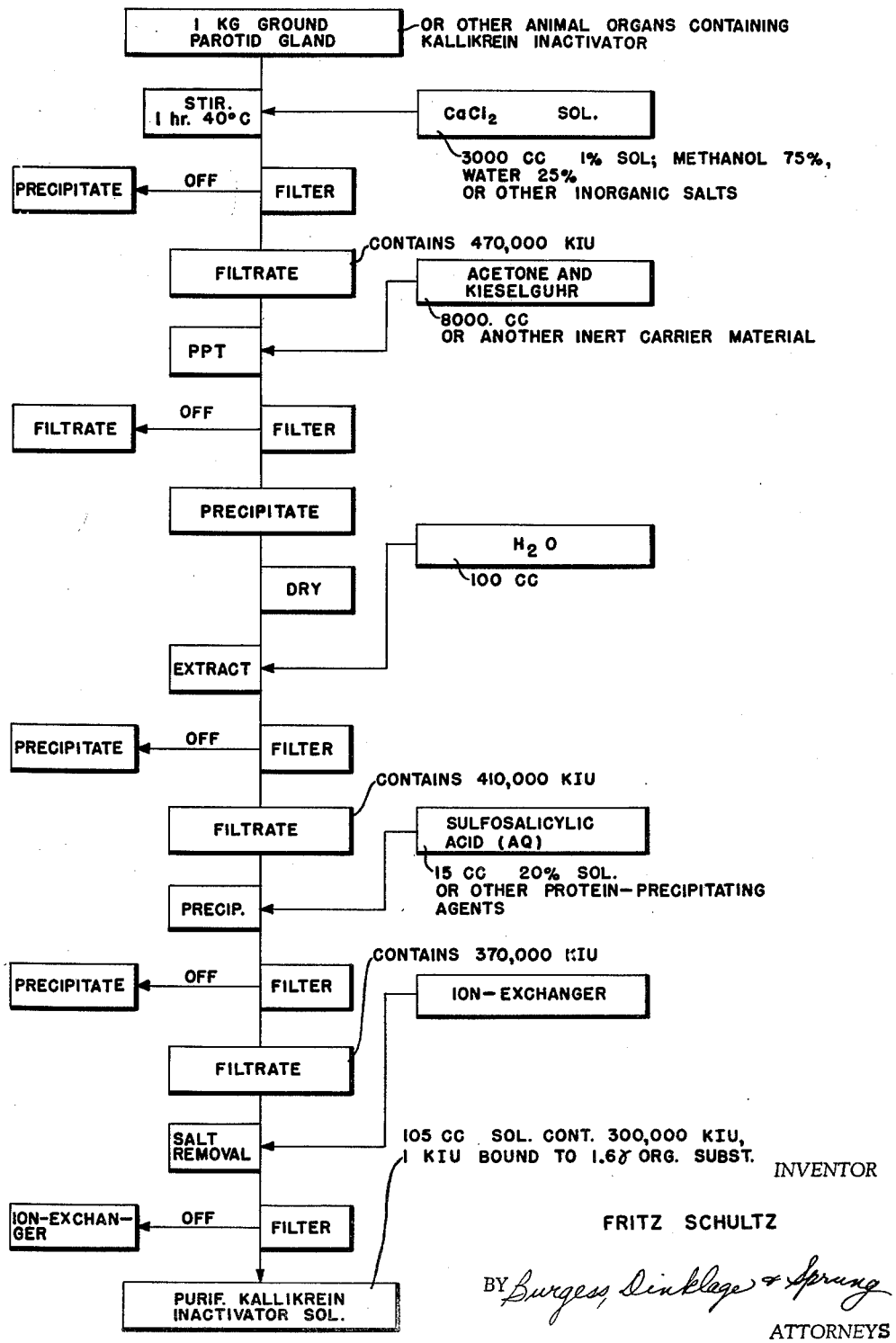

3,181,997
PROCESS FOR PREPARING PURIFIED SOLUTIONS OF KALLIKREIN INACTIVATOR
Fritz Schultz, Wuppertal-Sonnborn, Germany, assignor to Farbenfabriken Bayer Aktiengesellschaft, Leverkusen, Germany, a corporation of Germany
Filed Sept. 20, 1962, Ser. No. 224,939
Claims priority, application Germany, Mar. 28, 1959, F 28,061; June 18, 1960, F 31,463
10 Claims. (Cl. 167—74)

This invention relates to a process of preparing substantially pure kallikrein inactivator solutions in high concentrations, and to novel pharmaceutical preparations containing in solution a physiologically active principle called kallikrein inactivator, and is a continuation-in-part consolidation of applications Ser. No. 13,433, filed March 8, 1960, and Ser. No. 116,695, filed June 13, 1961, now abandoned.

Kallikrein is a physiologically active principle which simultaneously causes a decrease of the blood pressure and an increase of the blood circulation of the lungs, brain, skin and muscles. Preparations containing kallikrein inactivator posses thereapeutic importance as retarders of the circulatory hormone-kallikrein, and additionally as an inhibitor of proteolytic enzymes, and as a means for administering large doses of kallikrein in inactive form.

An inactivator of kallikrein is found in the lymph glands and the parotid glands, as well as in the pancreas, liver, spleen and blood of cattle, and has been obtained heretofore by extraction of the fat-free or dried animal organs with water, dilute acetic acid, and mixtures of acetic acid and an alcohol miscible with water, and precipitating the inactivator from these solutions by addition of a ketone or alcohol. The precipitated kallikrein inactivator is dissolved and inactive accompanying substances are precipitated from the solution.

In German Patent No. 954,284 there is described a process for preparing kallikrein inactivator from animal organs, such as cattle lymph and parotid glands in which proteins are precipitated from aqueous or acetic acid extracts of de-fatted and dried organs with trichloroacetic acid, rendering the solutions of the inactivator weakly alkaline and treating the solutions with an equal volume of alcohol, thus precipitating the inactive accompanying substances, adjusting the filtrate to a pH of about 6 with acetic acid, concentrating the solution under vacuum, extracting the concentrate with ether, and precipitating the inactivator therefrom by an addition thereto of 10 times its amount of alcohol.

U.S. Patent No. 2,890,986 describes a process for the preparation of kallikrein inactivator from lymph and parotid glands, pancreas or blood, in which the former organs are twice de-fatted with 5 times their volume of acetone; the de-fatted organ material is extracted with hot acidic alcohol, the extracts concentrated under vacuum extracted with ether, the inactivator precipitated from the aqueous phase with alcohol, acetone or other water-miscible organic solvent, the precipitate dissolved in dilute acetic acid, inactive accompanying substances removed by rendering the solution weakly alkaline and the inactivator re-precipitated with alcohol, acetone or water-misicible organic solvent.

German patent specification No. 956,097 discloses that kallikrein inactivator can also be obtained in an analogous manner from liver, spleen or colostrum.

Additional processes for obtaining kallikrein inactivator from liver are described in German patents, Nos. 1,014,288 and 1,011,576. According to the first-mentioned patent, cow-liver is homogenized, extracted with dilute aqueous trichloroacetic acid, the latter removed by continuous extraction with ether, the inactivator precipitated with a solution of saturated ammonium sulfate, the precipitate dissolved in water and re-precipitated with picric acid. The picrate is decomposed with dilute acid and the solution chromatographed by passing it first over a weakly basic and then over a weakly acid ion exchanger, thus adsorbing the inactivator which is then eluted with acid.

According to the second patent specification, the precipitation with ammonium sulfate and picric acid is substituted by a precipitation with acidic acetone, the process being otherwise similarly conducted.

The known processes suffer from the disadvantage that they are unsuitable for commercial operation in that they are too complicated and, additionally, are economically unsatisfactory in that continuous extraction with ether, evaporation of large volumes under vacuum, and defatting and drying of animal organs and the requirement for a considerable number of purification steps (7 to 9) render the product subject to bacterial contamination, and, further, in spite of the attempts at purification, contain protein, thereby giving rise to foreign protein reactions on administration.

An object of the invention is to provide a process for the production of solutions of kallikrein inactivator in a particularly simple and efficient manner.

Still a further object of the invention is the production of very pure concentrated solutions of kallikrein inactivator.

These and further objects and advantages of the invention will be apparent from the following description taken in view of the drawing which constitutes a flow sheet of an embodiment of the invention.

In accordance with the invention, it has now been discovered that the above objects can be achieved and kallikrein inactivator isolated from glandular tissue or blood in a state of improved purity and in a nearly quantitative yield without the disadvantages of the art by extracting comminuted animal organs containing kallikrein inactivator as, for example, parotid, pancreas, liver, spleen, blood or lung with an aqueous solution and/or a solution of a water-miscible organic solvent of a salt or hydroxide of an alkaline earth metal, alkali metals or ammonium of a transition or post transition metal, as, for example, of zinc, cadmium, mercury, aluminum, titanium, tin, lead, arsenic, antimony, bismuth, copper, chromium, molybdenum, tungsten, uranium, selenium, tellurium, manganese, iron, cobalt and nickel, precipitating the extract with a ketone, preferably in the presence of a finely divided inert carrier material, extracting the separated precipitate with water, quantitatively precipitating the residual protein from the solution with a protein precipitating agent, and removing excess protein precipitating agent from the solution remaining after separation of the precipitate by means of ion exchangers. A very pure and highly concentrated solution of inactivator is obtained in a high yield which can be directly administered intravenously or intramuscularly in high dosages. Examples of salts which are suitable for use in the extraction include salts of the following acids: acetic acid, propionic acid, lactic acid, tartaric acid, citric acid, hydrochloric acid, hydrobromic acid, hydroiodic acid, hydrofluoric acid, hydrazoic acid, sulfuric acid, phosphoric acid, hypophosphoric acid, phosphorous acid, hypophosphorous acid, nitric acid, thiocyanic acid, cyanic acid, hypocyanic acid, carbonic acid, sulphurous acid, hydrogen sulfide, thiosulfuric acid, hyposulphurous acid, bromic acid, chloric acid, iodic acid, periodic acid, perbromic acid, perchloric acid, boric acid, chromic acid, manganic acid, permanganic acid, pyrochromic acid, oxalic acid, arsenic acid, antimonic acid, ferrocyanic acid, ferricyanic acid, molybdanic acid, performic acid, aluminum sulfuric acid, etc.

Examples of inorganic salts which are highly suitable for isolating the kallikrein inactivator include the following: calcium chloride, magnesium chloride, sodium chloride, ammonium sulfate, copper chloride, copper bromide, copper sulfate, copper acetate, copper nitrate, zinc sulfate, zinc acetate, aluminum chloride, aluminum sulfate, alum, lead nitrate, lead sulfate, lead acetate, manganese sulfate, manganese chloride, ferric chloride, ferrous sulfate, potassium aluminum sulfate, etc.

Inorganic salts of metals or acids other than as just mentioned may be employed to the same effect for producing the substantially pure solutions of kallikrein inactivator provided that the salt selected has the necessary solubility in water, aqueous-organic solvent as, for example, aqueous alcohols or in a water-miscible organic solvent as, for example, an alcohol.

Examples of suitable water-miscible organic solvents for use in the invention are, for example, methanol, ethanol, propanol, isopropanol, butanol, isobutanol, tert. butanol, glycol, glycerol, acetone, methyl ethyl ketone, diethyl ketone, dioxane, tetrahydrofurane, polyoxyethylene or mixtures of these solvents.

The organs from which the inactivator is to be obtained are comminuted in the fresh or frozen state by any known or conventional means, as, for example, in cutters or meat mincers. The extraction of fat or drying of the tissue with large volumes of acetone required in the methods, as hitherto practiced, is not necessary in accordance with the invention.

The process is carried out by extracting the comminuted animal organ containing the kallikrein inactivator as, for example, parotid, liver, pancreas or lung, with an aqueous solution of the inorganic salt with such a solution additionally containing a water-miscible organic solvent or with the salt in solution in the water-miscible organic solvent. The kallikrein inactivator is precipitated by addition of a ketone, preferably acetone, and preferably in the presence of finely divided inert carrier material, the precipitate extracted with water, the residual protein precipitated from the extraction solution with a protein-precipitating agent and the excess of that agent removed with ion exchangers.

The isolation of the kallikrein inactivator is carried out by simply stirring the comminuted organs in two to four times their amount of extracting agent. The extraction of the kallikrein inactivator is carried out without the addition of acids which dissolve appreciable amounts of accompanying substances, thus interfering with the further process of purification. The addition of the metal salts or hydroxides ensures a very high yield, but at the same time the obtaining of a satisfactory degree of purity.

It has proved to be particularly expedient to add organic water-miscible solvents and preferably an alcohol to the aqueous extracting agent. Thus, for example, a preparation prepared in accordance with the invention by extraction of parotid effected at 40° C. for ½ hour with a 75% solution of methanol containing 1% calcium chloride contains less than 35γ of organic substance per kallikrein inactivator unit (KIU), the yield amounting to about 500,000 KIU/kg. parotid. Under the same conditions, there is obtained from lung a preparation containing less than 7-9γ of organic substance per kallikrein inactivator unit, the yield amounting to about 1.2 millions KIU/kg. lung.

It is occasionally possible to use for the extraction, solvents which do not initially contain water but which adsorb water required for the extraction from the fresh glands.

The action of the individual salts or hydroxides is not specific, the salts affect only the physical conditions of extraction. When using hydroxides, the solution should neither be too strongly alkaline nor maintained alkaline for too long a time.

The extraction can be carried out in an aqueous medium at a temperature of between 0 and 90° C., and preferably of between 20 and 60° C. If the extracting agent contains a water-miscible organic solvent, the temperatures should be kept advantageously at a comparatively low value in order to avoid evaporation of the solvent.

The extraction time depends on the starting material, the temperature and the solvent used. From parotid there is obtained, for example, when using 1-10% aqueous calcium chloride solutions at 45° C., optimum outputs even after 15 minutes, at 20° C. after 60 minutes; when using a 70% methanolic solution containing 1% calcium chloride at 40° C. it is necessary to stir ½ to 1 hr.

In the following step, the kallikrein inactivator is precipitated with a water-soluble ketone, preferably acetone. However, other ketones, such as methyl ethyl ketone, methyl isobutyl ketone or cyclohexanone can also be used. Depending upon the precipitating agent and the extraction solution, for quantitative precipitation there is required 2½ to 8 times the amount of extract, of ketone. If the precipitation is carried out with extracts containing the kallikrein inactivator in a relatively pure form, no precipitate is formed but rather a fine milky suspension containing the active substance in the form of minute oily droplets. These adhere to the walls of the vessel and agitator in the form of a haze-like film and cannot be satisfactorily recovered. Therefore, a suitable finely-divided inert carrier substance is stirred into the solution prior to the ketone precipitation and the precipitating agent is then admitted into the mixture. The minute oily droplets are completely absorbed by the carrier as, for example, kieselguhr or precipitated chalk. Upon stopping the agitator, the loaded carrier material rapidly falls to the bottom and can easily be separated from the supernatant clear solution. In this manner, the precipitation of the inactivator takes place almost without any losses and centrifuging or filtering of the relatively large volumina is avoided.

The carrier mass loaded with the inactivator is advantageously dried prior to further processing. After precipitation with acetone, the mass is air-dried on a drying sheet and after a few hours a dust-dry powder is obtained. If ketones having a high boiling point have been used, the carrier is washed with a little ether prior to drying.

The active substance can be dissolved out with water from this powder within a few minutes without loss in yield of substance and separated by suction filtration from the carrier material. In this manner, high concentrations of up to 15,000 KIU in 1 cc. can be attained. As a result, preparations resulting even from gland batches of 100 kg. and more can be further processed in the laboratory after this stage. Proteins still present in the solution are quantitatively removed by precipitation with a relatively small amount of a protein-precipitating agent, and most advantageously with an aqueous sulfosalicylic acid solution. After separation of the protein precipitate, the inactivator is substantially quantitatively present in the residual solution. In contrast, the protein removal with trichloracetic acid, uranyl acetate or metaphosphoric acid often shows greater losses.

The excess of the precipitating agent is removed by stirring with a suitable ion exchanger. Particularly suitable anion exchangers are, for example, "Amberlite" IRA-410 (a registered trademark). "Amberlite" designates the trademark for modified, phenolic resins, 100% phenolic resins and maleic rosin esters for use in varnishes, enamels and printing inks manufactured by Rohm & Haas, Pa. (See the Merck Index, 7th edition, Merck & Co. Inc., p. 1583-4, for Amberlite IR-120 and Amberlite IR-410.) "Amberlite" IRA-410 having a particle size of 20 to 30 mesh, loaded with a sodium hydroxide solution, has proved to be particularly suitable. However, other exchangers can also be used, for example, "Lewatit" MIH (a registered trademark) loaded with ammonia. "Lewatit" MIH designates a moderately basic anion resin (see The Merck Index, 7th edition, Merck &

Co. Inc., p. 1581), manufactured by Naftone, Inc., New York. The removal of sulfosalicylic acid is especially rapidly obtained by initially treating the solution for 10 minutes with a cation exchanger, for example, "Amberlite" IR–120, loaded with hydrogen chloride. When adding to the cation-free solution the above-mentioned anion exchanger, no further trace of sulfosalicylic acid is detectable after 20 or 25 minutes.

This process has great advantages compared with processes using exchange columns which are time-consuming because of the low flow rate therethrough and inevitably leading to a large increase of volume and great dilution. Moreover, the stirring method as used herein readily permits rapidly completing of the exchange. The solution can then immediately be separated from the ion exchanger, thus avoiding appreciable losses which otherwise occur due to secondary reactions. A combination between the inactivator and the exchange material, as described in German patent specifications Nos. 1,014,288 and 1,011,576, does not occur.

The salt- and protein-free solution is separated by suction-filtering from the exchanger, washed with a little redistilled water, and adjusted to pH 5–6. After biological standardization it may be diluted, filtered under sterile conditions and filled into ampoules. It is pyrogen-free, does not contain any antigens and is tolerated by man without reactions when administered intravenously even in very large doses. Treatment of large amounts of starting material yield invariably outputs exceeding those of the known processes by 2–3 times. The degrees of purity are likewise very high, averaging, when using a methanolic calcium chloride solution and parotid, 1.8$\gamma$ and when using lungs 0.9$\gamma$.

The products of the process of the invention are novel, stable, pharmacologically acceptable solutions of kallikrein inactivator having a high degree of purity, and having a purity degree of less than 35, preferably less than 7 and most preferably less than 5.

The kallikrein inactivator present in these solutions is believed to be a polypeptid having a molecular weight of 11,000 to 12,000. It contains 16 different amino acids: alanine, arginine, asparagic acid, cysteine, glutamic acid, glycine, isoleucine, leucine, lysine, methionine, phenylalanine, proline, serine, threonine, tyrosine, and valine. The kallikrein inactivator molecule is believed to contain about 120 molecules of these amino acids.

The kallikrein inactivator molecule as present in these solutions is believed to have, as an N-terminal amino acid group, arginine, and as C-terminal group, the amino acid sequence, cysteine-threonine-glycine-alanine. Kallikrein inactivator is fairly stable against acids up until a pH value of about 2. It is not as stable against alkali. At lower temperature it is stable for a few hours up until a pH value of about 9. In neutral solution it is stable for about 30 minutes at 80° C.

The solutions of kallikrein inactivator are stable against heating to 80° C. for one hour. The active principle therein is destroyed to 10% by boiling for one hour or by boiling twice for ½ hour periods, it is destroyed to 50% by heating to 115° C. for 1 hour. The aqueous solution of kallikrein inactivator in accordance with the invention at room temperature and pH of about 6, are unlimitedly stable.

The invention is further illustrated by the following examples but it is not restricted thereto.

*Example 1*

5 kg. of cattle parotid glands are comminuted in a meat mincer and introduced with stirring into a solution of 150 g. of manganous chloride in 2.2 liters of water and 12.8 liters of methanol. The suspension is then heated to 40° C. and stirred for 1 hour. After cooling to about 10° C., the liquid is filtered off with suction and the residue washed with 1.5 liters of 70% methanol.

60 g. of kieselguhr are added with vigorous stirring to the combined filtrates, and 40 liters of acetone are thereafter run in. Agitation is stopped after ½ hour. The kieselguhr loaded with the active substance settles down at the bottom and is separated, washed with 600 cc. of acetone and dried in air.

The powder thereby obtained is extracted with 600 cc. of redistilled water, the active substance being present in the filtrate. A 20% sulfosalicylic acid is then added until the removal of proteins is completed, 60–80 cc. being required for this purpose. The precipitate is separated and discarded.

For the removal of excess precipitating agent and also to accomplish desalting and decoloration, the solution is treated with ion exchangers, the cation exchanger "Amberlite" IR–120 and the anion exchanger IRA–410 being advantageously used in this regard. The active substance is not bound by the exchangers.

The yield amounts to 187,000 KIU per kilogram of parotid used, whereby 1 KIU corresponds to 0.75$\gamma$ of organic substance.

*Example 2*

If cattle lung is used as starting material instead of parotid and worked up in the same manner as that described in Example 1, a yield of 570,000 KIU per kilogram of lung used is obtained with a purity degree of 0.5$\gamma$ of organic substance per 1 KIU.

*Example 3*

5 kg. of well comminuted cattle lung are vigorously stirred at 20° C. for 3 hours in 15 liters of a 1% aqueous solution of zinc acetate and, after the addition of kieselguhr, filtered off with suction. 75 liters of acetone are stirred into the aqueous filtrate after the addition of 75 g. of kieselguhr, the clear solution is separated from the residue which is washed with acetone and dried in air.

This kieselguhr powder containing the total amount of active substance is extracted with 1200 cc. of water and further processed as described in Example 1. Upon treatment with ion exchangers, a salt-free aqueous solution is obtained which contains 660,000 KIU per kilogram of lung used; 1 KIU refers to 0.79$\gamma$ of organic substance.

*Example 4*

5 kg. of parotid glands of cows are comminuted in a meat mincer and introduced with stirring into a solution of 150 g. calcium chloride in 2.5 liters water and 12.8 liters methanol. The mixture is then heated to 40° C. within ½ hour and the temperature kept constant for 1 hour. After cooling to 10° C. the liquid is separated from the residue by means of a filter press or centrifuge. The residue is washed with 1.5 liters 70% methanol and the clarified filtrates are combined.

60 g. kieselguhr are added, with vigorous stirring to the solution and 40 liters acetone are run in. Agitation is stopped after ½ hour. The kieselguhr loaded with the active substance settles at once. The supernatant solution is crystal-clear and is syphoned off from the precipitated material. The residue is centrifuged, washed with 600 cc. acetone and then spread on a drying sheet. After a few hours, a dust-dry powder is obtained which is stirred with 260 cc. redistilled water for 10 minutes. The active substance dissolves, kieselguhr is filtered off with suction and washed with 250 cc. redistilled water. A 20% aqueous solution of sulfosalicylic acid is introduced, with stirring, into the combined filtrates until the removal of proteins is complete. 65–80 cc. of precipitating agent are required. The precipitate is filtered off with suction, the active substance remaining in the solution.

Excess of the protein-precipitating agent is removed by stirring into the solution 150 cc. of cation exchanger "Amberlite" IR–120 having a particle size of 20–50 mesh and loaded with hydrochloric acid. After 10–15 minutes, the acid solution is separated from the exchanger and washed with a little redistilled water. The solution is then stirred with 400 cc. of anion exchanger "Amberlite" IRA–410 having 20–50 mesh and loaded with a solution of sodium hydroxide until no further trace of sulfosalicylic acid is detectable in a sample (color reaction with iron chloride). The solution separated from the exchanger is neutralized with a little hydrochloric acid. It contains 1,450,000 kallikrein inactivator units; 1 KIU corresponds to 1.7γ of organic substance. Instead of methanol, ethanol may also be used as the organic solvent.

If the active substance is extracted from the glands with an aqueous solution of calcium chloride without the addition of an organic solvent, 525,000 KIU having a purity degree of 13γ are obtained. The calcium chloride may be replaced by sodium chloride, sodium sulfate, sodium nitrate, sodium carbonate, sodium hydrogen phosphate, sodium acetate, potassium hydrogen phosphate, potassium phosphate, ammonium chloride, ammonium carbonate, ammonium isothiocyanate, magnesium chloride, magnesium sulfate, magnesium nitrate, magnesium acetate, calcium hydroxide, calcium nitrate, calcium acetate, strontium chloride, barium chloride or zinc acetate.

If methyl ethyl ketone is used for the precipitation of the active substance from the methanolic solution instead of acetone, 1,050,000 KIU are obtained. (1 KIU corresponds to 7.8γ of organic substance.)

If, however, the acetone is replaced by dioxane the yield is 920,000 KIU with a purity degree of 9.8γ.

If the removal of protein is carried out in the process first described with trichloracetic acid instead of with sulfosalicylic acid, a yield of 970,000 KIU having a purity degree of 4.1γ is obtained.

When cow liver is used instead of cow parotid as starting material, kallikrein inactivator is obtained in similar yields.

Example 5

5 kg. of well comminuted cow lung are heated in a solution of 150 g. calcium chloride in 13 liters methanol to 40° C. for 1 hour while stirring. The gland residue is centrifuged upon cooling and washed with 1.5 liters methanol. The combined filtrates are clarified by passage through a Seitz filter and 60 g. kieselguhr are stirred into this soluiton. 40 liters acetone are then run into the mixture, stirring is continued for ½ hour and the precipitate is separated. The residue is washed with a little acetone and air-dried.

The powder is extracted twice with 200 cc. portions of distilled water each time for ¼ hour, and the combined filtrates quantitatively precipitated with 65 cc. of a 20% aqueous solution of sulfosalicylic acid. After separation of the precipitate, the solution is stirred for 10 minutes with 70 cc. of the ion exchanger "Amberlite" IR–120, suction-filtered, and the filtrate stirred with 450 cc. of the exchanger "Amerlite" IRA–410 for 1 hour. The solution separated from the exchanger is neutralized with a little hydrochloric acid. 4,250,000 KIU having a purity degree of 0.7γ are obtained.

If the extraction of the active substance is carried out not in a methanolic but in a 1% aqueous calcium chloride solution, 110 liters of acetone are required for the precipitation of the active substance. Further processing is carried out as described above. The yield amounts to 1,050,000 KIU having a purity degree of 7.2γ.

Example 6

Example 1 is repeated but in place of the manganese chloride, ferric chloride is used. There is recovered 150,000 KIU/kg. of parotid having a purity of 1.15γ/1 KIU.

Example 7

Example 1 is again repeated but, in place of the manganese chloride, aluminum chloride is used. There is recovered 215,000 KIU/kg. of parotid having a purity of 0.9γ/KIU.

Example 8

If cattle lung is used as starting material instead of parotid and worked up in the same manner as the procedure described in Example 1 but using in place a manganese chloride a 1% solution of copper chloride, there is obtained 530,000 KIU/kg. cow lung having a purity of 1.04γ/KIU.

Example 9

Example 1 is repeated but, in place of cattle parotid gland, cattle pancreas is used. The yield and degree of purity are comparable to that obtained in Example 1.

Example 10

When the above example is repeated but in place of manganese chloride any of the following salts are used, analogous results are obtained: sodium acetate, lead nitrate, potassium propionate, lithium lactate, ammonium sulfate, zinc tartrate, calcium citrate, magnesium carbonate, cadmium chloride, mercuric iodide, aluminum nitrate, titanium formate, tin hydrazoate, lead phosphate, arsenic hypophosphate, arsenous bromide, antimony thiosulfate, bismuth sulfide, copper chlorate, chromium iodate, molybdenum iodide, uranium chloride, selenium oxalate, tellurium nitrate, manganese sulfate, iron sulfate, cobalt manganate, nickel thiocyanate, calcium borate, potassium aluminum sulfate, potassium perbromate, calcium antimonate and lithium carbonate.

Example 11

When Example 1 is repeated using in place of water any of the following solvents and/or aqueous solutions thereof, substantially analogous results are obtained: methanol, ethanol, propanol, isopropanol, butanol, isobutanol, t.butanol, glycol, glycerol, acetone, methyl ethyl ketone, diethyl ketone, dioxane, tetrahydrofurane and polyoxyethylene.

The products produced in the above-described manner permit the reversible inactivation of kallikrein. Amounts of 50 KIU inhibit 95% of the proteolytic activity of 100 crystallized trypsin, as well as of serum fibrinolysin (plasmin). Thus, a fibrin coagulum, which is dissolved completely by a definite amount of plasmin in less than one minute, is protected from dissolution by this amount of plasmin in the presence of the inactivator for up to 24 hours. The inhibition of the action of the fibrinolysis-promoting enzyme can also be shown on Hartert's thrombolastograph, the fibrinolysis activated by streptokinase being inhibited by the addition of the preparation in accordance with the invention.

Pharmacological testing shows a great therapeutic tolerance. 1–2 mg./kg. (200–400 KIU/kg.) administered intravenously to the narcotized cat did not influence the bood pressure. With substantially high doses, a drop in blood pressure occurs with average recovery. In this case, however, it may well be a question of a non-specific effect. In the narcotized dog, the effect of the intravenous administration of 200 KIU/kg. on the blood pressure could also not be detected.

Using Langendorff's method on isolated guinea pig hearts, doses of up to 2 KIU were without effect but higher doses caused a temporary slight increase in amplitude and 2000 KIU caused a temporary stoppage.

The preparation had no effect on isolated guinea pig duodenum and also was ineffective as to the bronchial width in narcotized guinea pigs.

The subcutaneous administration of a 0.5% solution of the preparation caused no irritating effects on rabbit ears.

The general toleration of the preparation is good. Intravenous doses of 0.1–0.3 g./kg. (20,000–60,000 KIU/kg.) were tolerated by white mice without noticeable effect.

The purified solutions of kallikrein inactivator obtained in accordance with the process of the present invention are, for example, effective in the treatment of pancreas necrosis (cf., for example, E. Asang: "Wandlungen in der Therapie enzündlicher Erkrankungen der Bauchspeicheldrüse" in Langenbecks Archiv. und Deutsche Zeitschrift für Chirurgie, volume 293, No. 5, 1960, pp. 645–670). For such treatments, which might last 14 days, the following dosage has proven useful:

3 days—10,000 KIU daily as continuous drop infusion or 5×2,000 KIU daily intravenously;
6 days—6,000 KIU daily as continuous drop infusion or 3×2,000 KIU daily intravenously;
3 days—4,000 KIU daily as continuous drop infusion or 2×2,000 KIU daily intravenously;
2 days—2,000 KIU intravenously daily.

In certain instances the kallikrein solution according to the invention renders surgical treatment tolerable at all. It furthermore does not show the undesired secondary effects which the crude, unpurified solutions have.

I claim:

1. In the process of preparing substantially pure solutions of kallikrein inactivator, the step which comprises extracting animal organ-containing kallikrein inactivator with a solution of up to 20% of an inorganic salt of a member selected from the group consisting of alkali metals, alkaline earth metals, zinc cadmium, mercury, aluminum, titanium, tin, lead, arsenic, antimony, bismuth, copper, chromium, molybdenum tungsten, uranium, selenium, tellurium, manganese, iron, cobalt, nickel and ammonium at a temperature ranging from 0 to 90° C. for from 5 minutes to 24 hours, said solution being formed by dissolving said salt in a member selected from the group consisting of water, water-miscible organic solvents and aqueous solutions containing a water-miscible organic solvent.

2. Process according to claim 1, wherein said water-miscible organic solvent is a member selected from the group consisting of methanol, ethanol, propanol, isopropanol, butanol, isobutanol, tert.butanol, glycol, glycerol, acetone, methyl ethyl ketone, diethyl ketone, dioxane, tetrahydrofurane, polyoxyethylene and mixtures of these solvents.

3. Process according to claim 1, wherein said inorganic metal salt is a salt of an acid selected from the group consisting of acetic acid, propionic acid, lactic acid, tartaric acid, citric acid, hydrochloric acid, hydrobromic acid, hydroiodic acid, hydrofluoric acid, hydrazoic acid, sulfuric acid, phosphoric acid, hypophosphoric acid, phosphorous acid, hypophosphorous acid, nitric acid, thiocyanic acid, cyanic acid, hypocyanic acid, carbonic acid, sulphurous acid, hydrogen sulfide, thiosulfuric acid, hyposulphurous acid, bromic acid, chloric acid, iodic acid, periodic acid, perbromic acid, perchloric acid, boric acid, chromic acid, manganic acid, permanganic acid, pyrochromic acid, oxalic acid, arsenic acid, antimonic acid, ferrocyanic acid, ferricyanic acid, molybdanic acid, performic acid, and aluminum sulfuric acid.

4. A process of preparing substantially pure solutions of kallikrein inactivator, the steps which comprise extracting cattle parotid gland with a 1.5% solution of manganese chloride in aqueous methyl alcohol at a temperature of about 40° C., precipitating the kallikrein inactivator from said extract with acetone in the presence of kieselguhr, extracting the separated precipitate with water, removing any residual protein in the solution thereby obtained with 20% sulfosalicylic acid as protein precipitating agent, removing said residual protein precipitating agent with an ion exchanger to thereby obtain a substantially pure solution of kallikrein inactivator.

5. Process of preparing substantially pure solutions of kallikrein inactivator, the steps which comprise extracting cattle lung with a 1% aqueous solution of zinc acetate at a temperature of about 40° C., precipitating the kallikrein inactivator from said extract with acetone in the presence of kieselguhr, extracting the separated precipitate with water, removing any residual protein in the solution thereby obtained with 20% sulfosalicylic acid as protein precipitating agent, removing said residual protein precipitating agent with an ion exchanger to thereby obtain a substantially pure solution of kallikrein inactivator.

6. Process of preparing substantially pure solutions of kallikrein inactivator, the steps which comprise extracting cattle lung with a 1.1% solution of calcium chloride in methanol at a temperature of about 40° C., precipitating the kallikrein inactivator from said extract with acetone in the presence of kieselguhr, extracting the separated precipitate with water, removing any residual protein in the solution thereby obtained with 20% sulfosalicylic acid as protein precipitating agent, removing said residual protein precipitating agent with an ion exchanger to thereby obtain a substantially pure solution of kallikrein inactivator.

7. Process of preparing substantially pure solutions of kallikrein inactivator, the steps which comprise extracting animal organ-containing kallikrein inactivator with a solution of up to 20% of an inorganic salt of a member selected from the group consisting of alkali metals, alkaline earth metals, zinc, cadmium, mercury, aluminum, titanium, tin, lead, arsenic, antimony, bismuth, copper, chromium, molybdenum, tungsten, uranium, selenium, tellurium, manganese, iron, cobalt, nickel and ammonium at a temperature ranging from 0–90° C. for from 5 minutes to 24 hours, said solution being formed by dissolving said salt in a member selected from the group consisting of water, water-miscible organic solvents, and aqueous solutions containing a water-miscible organic solvent, precipitating the kallikrein inactivator from said extract with a ketone in the presence of a finely divided inert carrier material, extracting the separated precipitate with water, removing any residual protein in the solution thereby obtained with a protein precipitating agent, removing said residual protein precipitating agent with an ion exchanger to thereby obtain a substantially pure solution of kallikrein inactivator.

8. Process according to claim 7, wherein said ketone is a member selected from the group consisting of acetone, methyl ethyl ketone, methyl isobutyl ketone, and cyclohexanone.

9. Process according to claim 7, wherein said ketone is acetone, said protein precipitating agent is sulfosalicylic acid and said ion exchanger is "Amberlite" IR–120.

10. A pharmaceutical preparation comprising a substantially stabilized aqueous solution of a material capable of inactivating kallikrein produced by the process of claim 1.

No references cited.

LEWIS GOTTS, *Primary Examiner.*
FRANK CACCIAPAGLIA, JR., *Examiner.*